United States Patent
Dragone et al.

[19]

[11] Patent Number: 5,926,586
[45] Date of Patent: Jul. 20, 1999

[54] NON-RECTANGULAR OPTICAL DEVICES

[75] Inventors: Corrado Dragone, Little Silver; Lawrence W. Stulz, Neptune, both of N.J.

[73] Assignee: Lucent Technologies Inc., Murray Hill, N.J.

[21] Appl. No.: 08/890,091

[22] Filed: Jul. 9, 1997

[51] Int. Cl.[6] .................................................. G02B 6/125
[52] U.S. Cl. .............................. 385/14; 385/15; 385/129; 65/386
[58] Field of Search .................................. 385/11, 14, 15, 385/24, 37, 129, 130, 43–45; 65/386

[56] References Cited

U.S. PATENT DOCUMENTS

| | | | |
|---|---|---|---|
| 4,021,097 | 5/1977 | McMahon | 385/44 |
| 5,502,781 | 3/1996 | Li et al. | 385/14 X |
| 5,515,460 | 5/1996 | Stone | 385/24 |
| 5,600,742 | 2/1997 | Zirngibl | 385/37 |
| 5,623,571 | 4/1997 | Chou et al. | 385/130 |
| 5,629,991 | 5/1997 | Dragone | 385/11 |
| 5,745,616 | 4/1998 | Zirngibl | 385/37 |

*Primary Examiner*—John D. Lee

[57] ABSTRACT

An integrated optical device (e.g., a wavelength router) is formed on a substrate, where the device has a compressive force within the plane of the device and the substrate has at least one non-straight edge. The device is formed by annealing the substrate wafer and then separating the device by cutting along one or more non-straight or curved lines. When the device layer is much thinner than the substrate and when the coefficient of thermal expansion of the substrate material (e.g., silicon) is greater than that of the device material (e.g., silica), the annealing process generates the compressive force. This in turn enables the device to be separated from a wafer by cutting along non-straight lines using either a laser or a milling machine without fear of cracks and fissures propagating over time into the device. The present invention enables manufacturing with greater yields since curved devices, such as wavelength routers, can be more efficiently packed onto a single wafer. The present invention can also reduce crosstalk by eliminating the direct substrate path through which stray light, resulting from misalignments between optical fibers and the device input ports, could otherwise pass.

34 Claims, 5 Drawing Sheets

402 — FORM ONE OR MORE DEVICES ON A SINGLE WAFER

404 — ANNEAL THE WAFER TO CREATE A LATERAL COMPRESSIVE FORCE

406 — SEPARATE DEVICES FROM WAFER USING AT LEAST ONE NON-LINEAR CUT

NON-RECTANGULAR OPTICAL DEVICES

BACKGROUND OF THE INVENTION

1. Field of the Invention

The present invention relates to optical devices, such as wavelength routers and optical multiplexers, used in light-based telecommunications and computer networks.

2. Description of the Related Art

A wavelength router is a type of optical device that selectively routes light of a particular wavelength from an input port to an output port. When used to route light of differing wavelengths from more than one input port and/or to more than one output port, a wavelength router can be used to operate as an optical multiplexer and/or demultiplexer.

FIG. 1 shows a schematic diagram of a typical wavelength router 100 implemented as an integrated device formed on a suitable substrate 102 (e.g., silicon or silica). Router 100 has a plurality of input waveguides 106 adapted to receive light from one or more incoming optical fibers that may be connected to one or more of the input ports 104. Router 100 also has a plurality of output waveguides 114 adapted to transmit light to one or more outgoing optical fibers that may be connected to one or more of the output ports 116. Between the input and output waveguides are two free spaces 108 and 112 separated by a set of waveguides that form the arms 110 of the router.

In operation, light received at one of the input ports 104 is transmitted along the corresponding input waveguide 106 to free space 108. Light entering free space 108 gets radiated for receipt by—and transmission along—each of the router arms 110 towards free space 112. Light entering free space 112 gets radiated towards the output waveguides 114.

Wavelength router 100 is preferably designed such that all of the optical distances from a particular location at the input side of free space 108 (i.e., where one particular of the input waveguides 106 meets free space 108) along each router arm 110 to a particular location on the output side of free space 112 (i.e., where one particular of the output waveguides 114 meets free space 112) differ by an integer multiple of a particular wavelength. As such, light of that particular wavelength entering free space 108 from that particular input waveguide 106 will be focused on the output side of free space 112 at that particular output waveguide 114. That is, light of that particular wavelength will constructively interfere (i.e., add in phase) at that particular output waveguide location, and substantially destructively interfere at all other output waveguide locations. Moreover, light of most other wavelengths will not, in general, be focused (i.e., will effectively destructively interfere) at that particular output waveguide location. As such, wavelength router 100 can be used as an optical passband filter.

Furthermore, to the extent that wavelength router 100 can be designed to focus light having different wavelengths at different output waveguide locations on the output side of free space 112, router 100 can operate as a one-to-many optical multiplexer that can receive light of different wavelengths from a single incoming optical fiber and selectively transmit those different frequencies to different output ports for propagation along different outgoing optical fibers. Similarly, router 100 can be further designed to operate as a many-to-one optical demultiplexer or many-to-many optical multiplexer that receives different wavelength light from different incoming optical fibers for transmission to different outgoing optical fibers. Moreover, router 100 may be a symmetric optical device that can be operated in either direction (i.e., either from left to right or from right to left in FIG. 1). Typically, the router is realized using silica waveguides deposited on a thick substrate of quartz or silicon.

As shown in FIG. 1, router 100 is an integrated device formed on a substrate 102 that is rectangular in shape. The rectangular substrate shape results from standard integrated circuit (IC) manufacturing techniques in which one or more devices are fabricated on a circular wafer and then separated by cutting the wafer along straight dicing lines using a high-speed circular saw.

FIG. 2 shows a schematic diagram of three routers similar to router 100 of FIG. 1 as they would be formed during conventional manufacturing on a single wafer. To separate the three routers, the wafer is cut along the straight dicing lines indicated in the drawing using a high-speed circular saw.

One of the advantages of using a high-speed circular saw to make straight dicing cuts is that the resulting rectangular-shaped routers are relatively free from cracks and fissures that will propagate over time into the waveguides and free spaces of the router and thereby adversely affect the ability of the router to operate properly. As a result, such rectangular devices have relatively long operational lifetimes.

There are drawbacks, however, to the rectangular devices that result from using high-speed circular saws to make straight dicing cuts. One drawback is the relatively low manufacturing yield (i.e., the number of devices per wafer). Devices such as wavelength router 100 of FIG. 1 are typically large (e.g., 2×7 cm). As a result, a typical wafer will yield only two or three rectangular devices.

Furthermore, rectangular devices such as wavelength router 100 of FIG. 1 can produce undesirable crosstalk from stray light energy that passes from an incoming optical fiber directly through the substrate to an outgoing optical fiber due, for example, to misalignment of the incoming optical fiber at the input port, as shown schematically in FIG. 3. This stray light can lead to crosstalk in which light is inappropriately routed from one optical fiber to another. Such stray light may result from imperfect mounting of the optical fibers to the device.

What is needed is a scheme for avoiding the limitations of the prior art (e.g., low yield and crosstalk) without jeopardizing the advantages of the prior art (e.g., operational lifetime).

SUMMARY OF THE INVENTION

Embodiments of the present invention are directed to a method for fabricating integrated optical devices, comprising the steps of (a) forming at least one integrated optical device on a substrate wafer; (b) annealing the wafer to produce a compressive force within the plane of the device; and (c) separating the device from the wafer by cutting along at least one non-straight line.

Alternative embodiments of the present invention are directed to an integrated optical device fabricated by (a) forming the optical device on a substrate wafer; (b) annealing the wafer to produce a compressive force within the plane of the device; and (c) separating the device from the wafer by cutting along at least one non-straight line.

Further alternative embodiments of the present invention are directed to an integrated optical device formed on a substrate, wherein the device has a compressive force within the plane of the device and the substrate has at least one non-straight edge.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is related to a technique for manufacturing wavelength routers and other integrated optical devices that provides increased manufacturing yields and decreased crosstalk without jeopardizing the operational lifetimes of the devices. The manufacturing technique of the present invention applies to low loss optical devices made of silica, and it enables the manufacture of non-rectangular optical devices in which one or more of the cuts made during the manufacturing process are non-linear or curved cuts.

Figure 4:
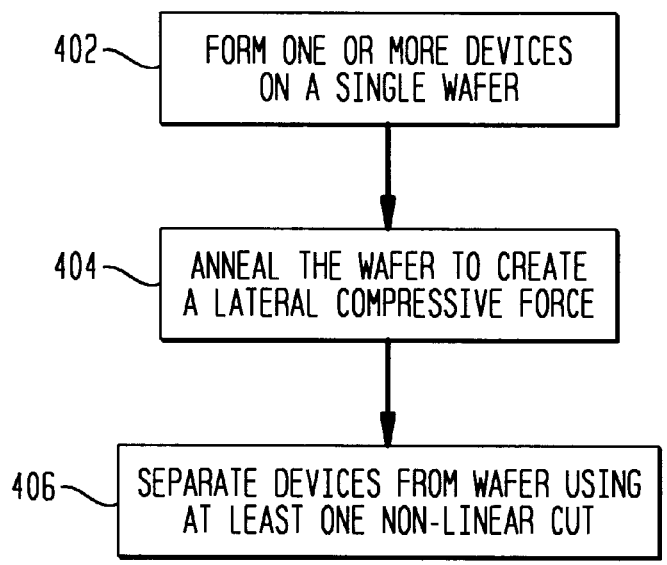
FIG. 4 shows a flow diagram of the device manufacturing process, according to one embodiment of the present invention.

FIG. 4 shows a flow diagram of the device manufacturing process, according to one embodiment of the present invention. Following procedures similar to those used for prior art devices, one or more integrated optical devices are formed on a single (e.g., circular) substrate wafer (step 402 of FIG. 4). Significantly, however, the materials preferably have two important characteristics: (1) the substrate is relatively thick as compared to the device layer(s), and (2) the coefficient of thermal expansion of the substrate material is greater than that of the device material. For example, in one implementation of wavelength routers according to the present invention, the substrate is silicon (or quartz) that is about 0.6 mm thick, while the device is formed from a relatively thin (e.g., about 30 microns) layer of silica (glass). The coefficient of thermal expansion of silicon is about seven times greater than that of silica.

After the devices are formed on the substrate wafer, the wafer is annealed (step 404). That is, for example, the temperature is raised to at least close to the flow temperature of the device material (e.g., around 900 degrees C. for silica) and then slowly lowered to the device operating temperature (e.g., room temperature). At that point, the individual devices can be separated from the wafer by cutting, where at least one of the sides of the device is cut along a non-straight or curved line (step 406). As a result, the individual separated devices are not rectangular in shape.

Figure 1:
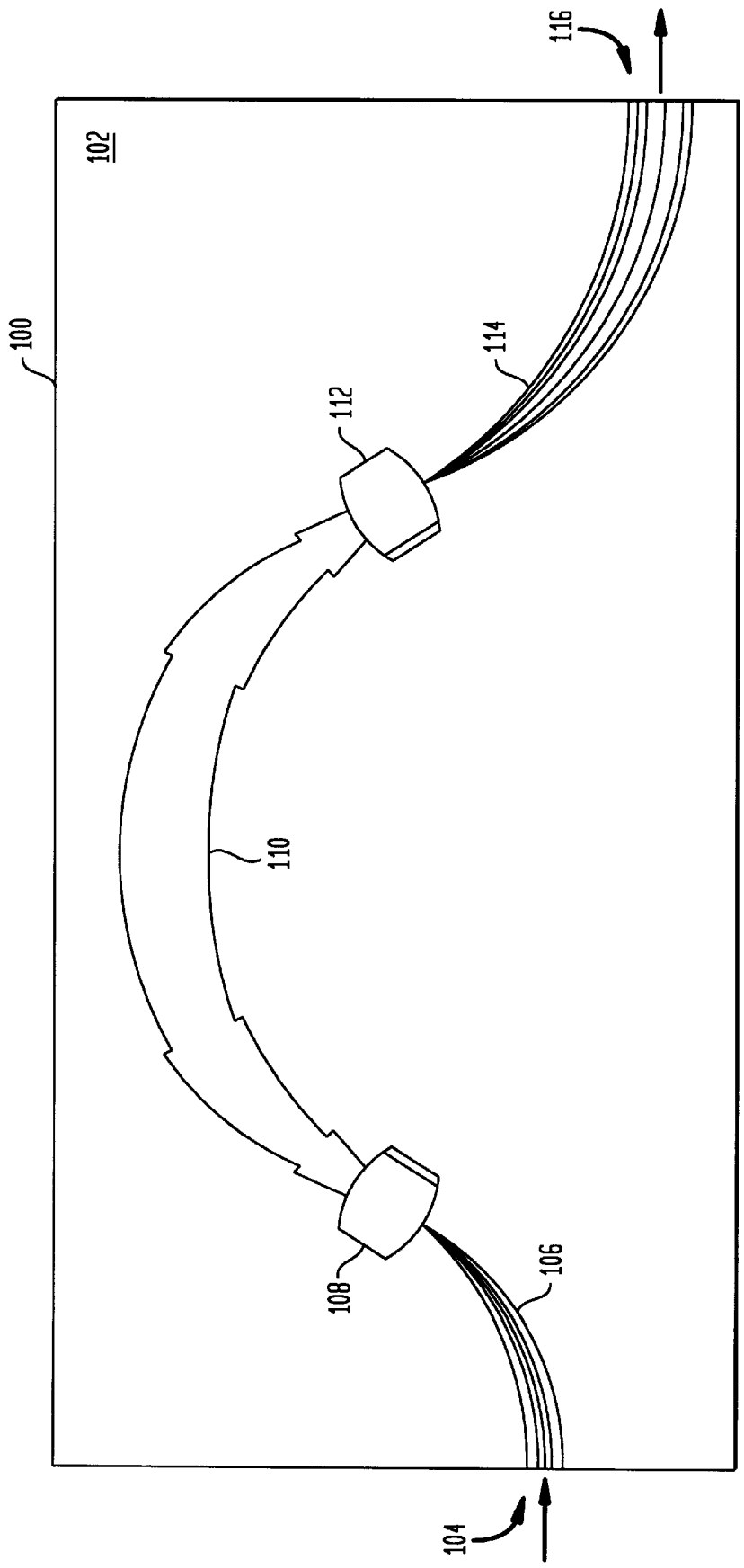
FIG. 1 shows a schematic diagram of a typical wavelength router.
Figure 5:
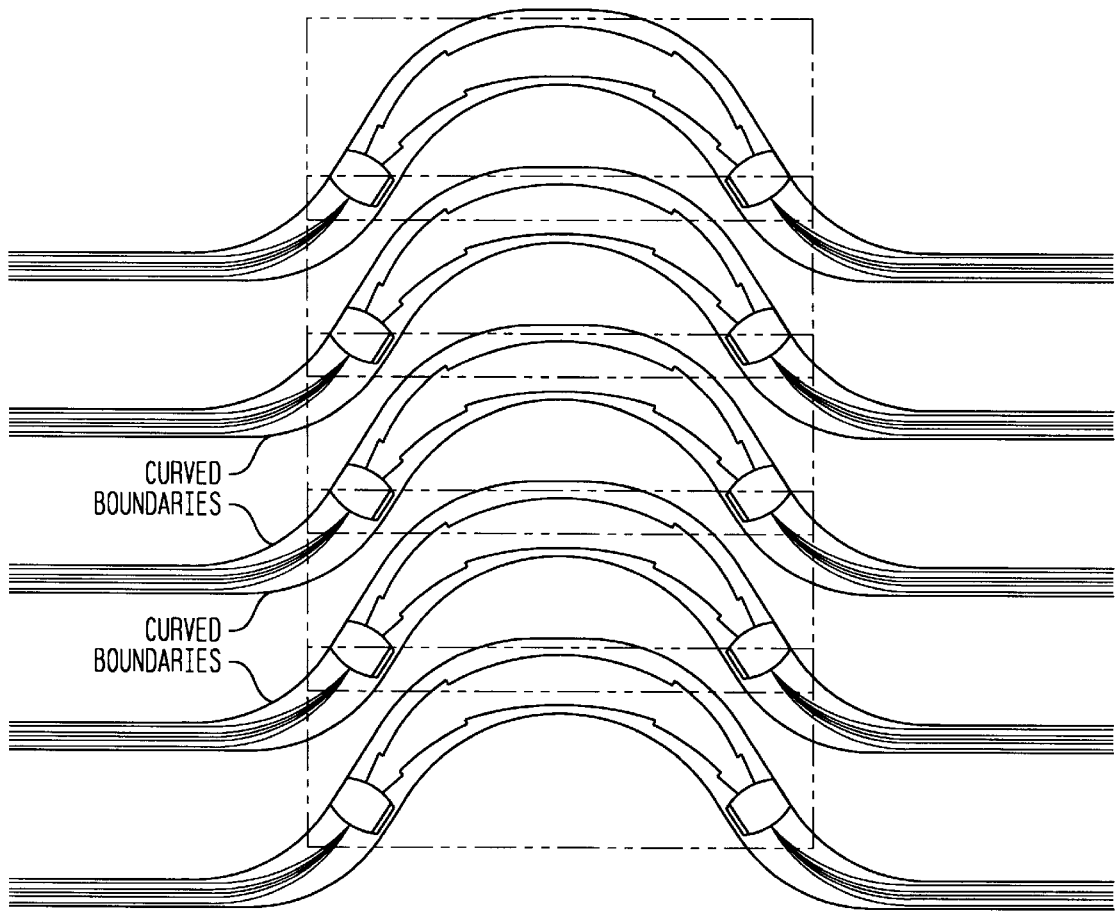
FIG. 5 shows a schematic diagram of a single substrate wafer upon which six different wavelength routers similar to the router of FIG. 1 have been formed, in accordance with the present invention.

FIG. 5 shows a schematic diagram of a single substrate wafer upon which six different wavelength routers similar to router 100 of FIG. 1 have been formed, in accordance with the present invention. As shown in FIG. 5, each router overlaps the rectangular boundary of at least one other router. That is, if one of the routers were to be separated using straight dicing cuts, at least one other router would necessarily be cut into at least two different pieces, thereby losing that other router in the dicing process.

Figure 2:
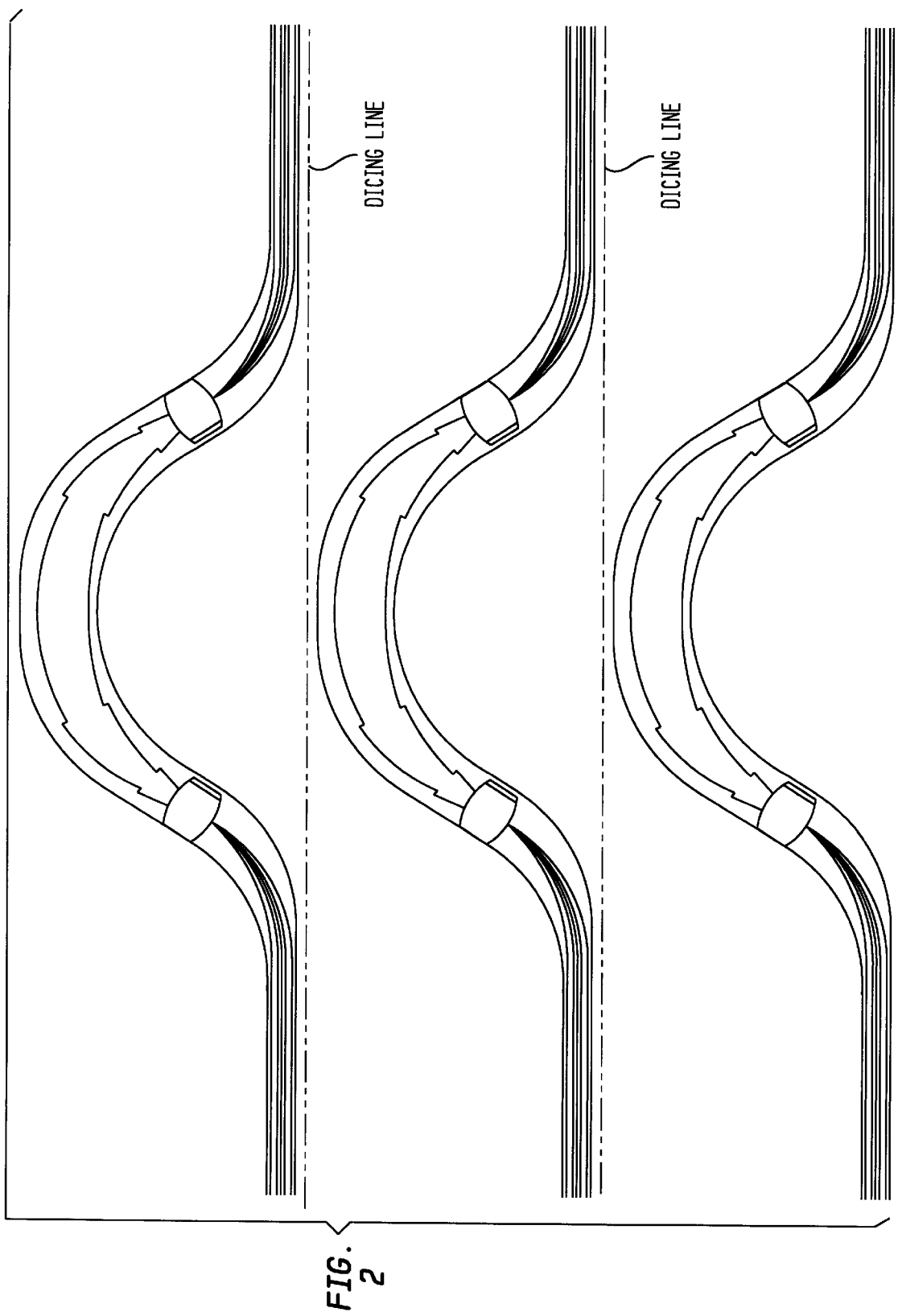
FIG. 2 shows a schematic diagram of three routers similar to the router of FIG. 1 as they would be formed during manufacturing on a single circular wafer.
Figure 3:
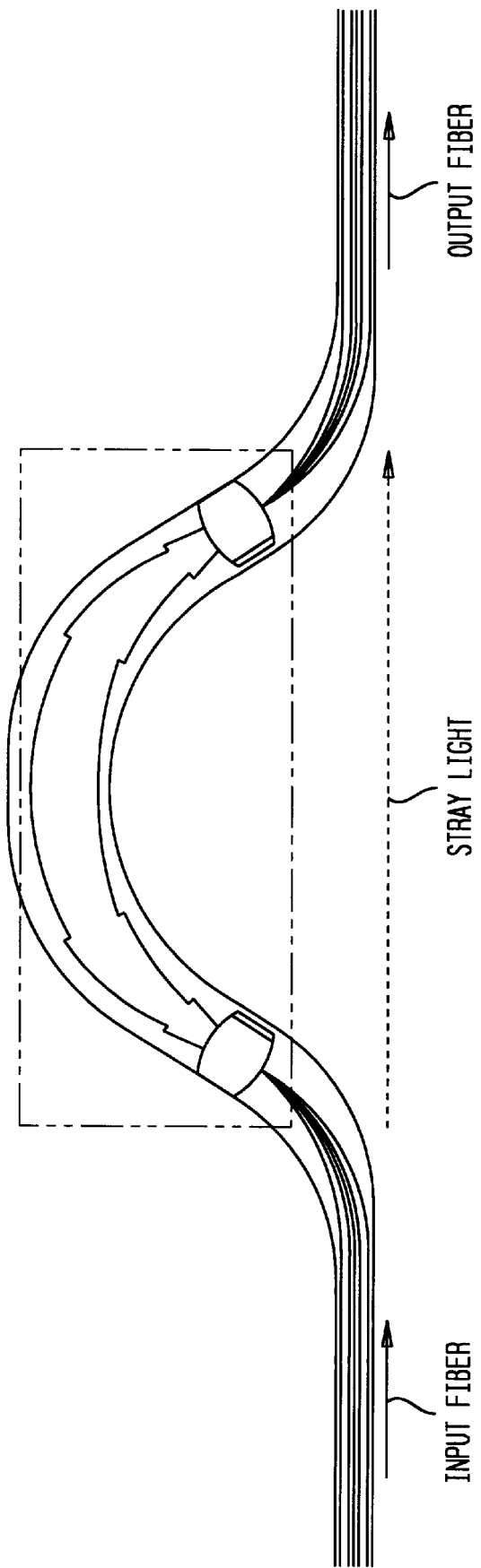
FIG. 3 shows how stray light can result in crosstalk in routers similar to the router of FIG. 1.

The final step (i.e., step 406 of FIG. 4) in the manufacturing process of the present invention, however, is to separate the six routers of FIG. 5 by cutting along curved lines that follow the contours of the shape of the routers (i.e., the curved boundaries), rather than along straight dicing lines as in the prior art of FIG. 2. In general, to reduce the chances of crack and fissure propagation, it is desirable to keep the curvature of such non-straight lines as low as possible, preferably avoiding radii of curvature smaller than a few millimeters.

One advantage of the present invention is the increased manufacturing yield. Instead of only two or three devices per substrate wafer, the present invention provides, at least in the example of FIG. 5, a yield of six devices per wafer.

Because the cut lines are no longer all straight, a high-speed circular saw cannot be used for all of the dicing lines. Instead a laser (e.g., pulsed $CO_2$) or milling machine is used for the curved cut lines. One of the reasons why prior art devices such as router 100 of FIG. 1 were always rectangular devices cut along straight dicing lines was the need to avoid cracks and fissures that would propagate into the device's waveguides and free spaces, taking into account that very high reliability, with negligible probability of failures over a period of many years, is generally required. High-speed circular saws make straight cut lines that have few if any cracks and fissures that will adversely affect a device's operational lifetime. On the other hand, using lasers and/or milling machines to make curved cut lines has been known to result in edges that do have cracks and fissures that will propagate over time and adversely affect the device operations.

The inventors have found, however, that the manufacturing process of the present invention results in devices having curved edges cut using either lasers or milling machines that nevertheless are sufficiently free of cracks and fissures that will propagate over time into the device waveguides and free spaces. The inventors believe that this advantage results from the annealing of the silica-on-silicon materials. Because the coefficient of thermal expansion of silicon is greater than that of silica and because the silica of the device is much thinner than the silicon of the substrate, the annealing process results in lateral (i.e., in-plane) compressive forces within the silica of the device. As a result, when the wafer is cut, the compressive forces operate to prevent cracks and fissures from propagating very far from the edge. Propagation is further inhibited by the thinness of the device layer and by the relative strength of the thick substrate. As such, even relatively "undesirable" cutting tools such as lasers and milling machines, which tend to leave edges that are much less smooth than those resulting from high-speed circular saws, can be used to separate the devices from the wafer. The curved edges will have defects, but cracks will not propagate in the silica, remaining confined to the immediate proximity of the substrate edge. The use of lasers and milling machines enables non-straight cuts to be made, which in turn enables higher manufacturing yields to be achieved.

The present invention provides yet another advantage: it can reduce crosstalk. Since the devices of FIG. 5 can be cut along curved lines, the devices can be cut in such a way as to eliminate the direct optical path between incoming and outgoing optical fibers. As a result, stray light at an input port will not easily reach the outgoing optical fibers, thereby reducing stray-light-induced crosstalk.

Figure 6:
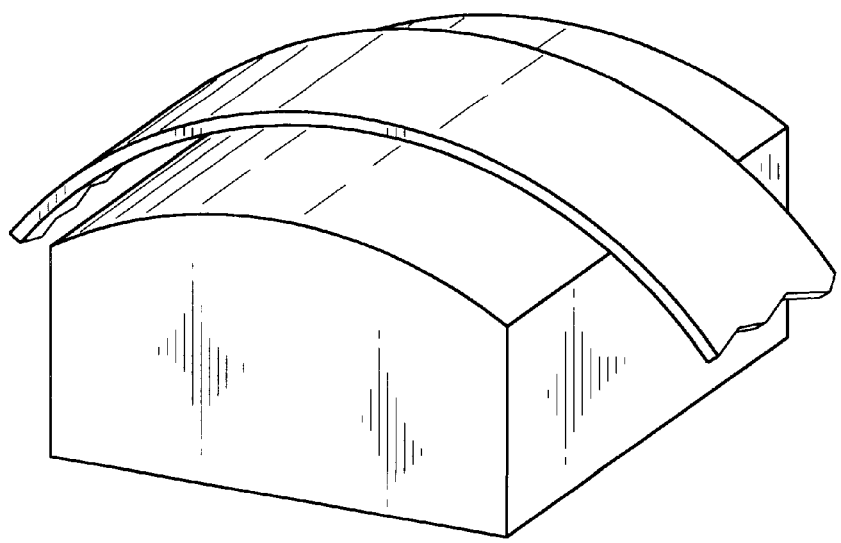
FIG. 6 shows a schematic diagram of the deforming or bending of a router of the present invention to slightly change the router transmission coefficients.

Still another advantage of the present invention relates to the ability to safely tune the routers of the present invention by deforming or bending the device as shown in FIG. 6 to slightly change the router transmission coefficients. Without the lateral compressive forces of the present invention within the device layer, such bending or deformation would tend to increase the propagation of cracks into the device.

Several devices according to the present invention were subjected to considerable bending (e.g., one meter radius of curvature) over a period of many months, without any failures (i.e., cracks developing). Also, considerable strain was induced over an extended region of the router by cementing the router to an aluminum plate, whose coefficient of thermal expansion is much larger than silicon. Even when the device was subjected to temperature cycles of ±20 degrees C., no failures were observed.

As mentioned above, one way to separate a device of the present invention is to use a laser. In particular, one technique is to employ focal-point machining using a pulsed laser of suitable wavelength. By properly focusing the laser and optimizing the pulses, one can insure that a large fraction of the laser energy is above the silicon ablation threshold. In that case, less energy goes into thermal processes, which may damage the surrounding area without contributing to material removal. As a result, most of the laser energy goes into material removal, and very little thermal energy is transferred to the surrounding area. The laser then produces a relatively small heat-affected zone in the vicinity of the cut and the quality of the cut will be good, i.e., clean walls, little debris or recast material, and little chipping of the glass layer. By properly choosing the pulse width and power, the width of the cut by this technique can be less than 100 microns.

A second technique is to use a milling machine, using a suitable cutting tool coated with diamond powder or other suitable abrasive. The main disadvantages.of this technique are that it is slow and it produces a relatively wide cut, typically exceeding 500 microns. On the other hand, with a good tool, well centered and properly coated, this technique produces little damage to the glass on either side of the cut. Therefore, this technique is particularly suitable to improve the surface quality after cutting with a laser.

In one implementation of the present invention, the devices are formed from silica on a silicon substrate. Those skilled in the art will understand that, in other implementations, devices of the present invention can be made from other materials. The important characteristics are those that result in a lateral compressive force within the device material. For example, such a compressive force results from annealing during manufacturing when (1) the device layer is thinner than the substrate and (2) the substrate material has a higher coefficient of thermal expansion than the device material.

In FIG. 5, the present invention is described in the context of wavelength routers. Those skilled in the art will understand that the present invention may be implemented in the context of integrated optical devices other than the wavelength routers of FIG. 5. For example, the present invention may be implemented in the context of folded routers in which two routers are combined with a mirror. In this case, after cutting the wafer, the mirror surface is polished and properly coated.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for fabricating integrated optical devices, comprising the steps of:
   (a) forming at least one integrated optical device on a wafer; and
   (b) separating the device from the wafer by cutting along at least one non-straight line, wherein the separated device is part of a non-rectangular substrate and a straight line from one port of the separated device to another port of the separated device passes outside of the non-rectangular substrate.

2. The invention of claim 1, wherein the device is formed from a layer of device material on a wafer of substrate material, such that the layer of device material is thinner than the wafer of substrate material and the substrate material has a greater coefficient of thermal expansion than the device material.

3. The invention of claim 2, wherein the substrate material is silicon and the device material is silica.

4. The invention of claim 3, wherein:
   the non-straight line is cut using a laser or a milling machine; and
   a plurality of devices are formed on the wafer, at least one device overlapping a rectangular boundary of another device.

5. The invention of claim 1, wherein the non-straight line is cut using a laser or a milling machine.

6. The invention of claim 1, wherein a plurality of devices are formed on the wafer, at least one device overlapping a rectangular boundary of another device.

7. The invention of claim 1, wherein the device is deformed to change its transmission coefficients.

8. The invention of claim 1, wherein step (a) further comprises the step of annealing the wafer to produce a compressive force within the plane of the device.

9. An integrated optical device fabricated by:
   (a) forming the optical device on a wafer; and
   (b) separating the device from the wafer by cutting along at least one non-straight line, wherein the separated device is part of a non-rectangular substrate and a straight line from one port of the separated device to another port of the separated device passes outside of the non-rectangular substrate.

10. The invention of claim 9, wherein the device is formed from a layer of device material on a wafer of substrate material, such that the layer of device material is thinner than the wafer of substrate material and the substrate material has a greater coefficient of thermal expansion than the device material.

11. The invention of claim 10, wherein the substrate material is silicon and the device material is silica.

12. The invention of claim 11, wherein:
   the non-straight line is cut using a laser or a milling machine; and
   a plurality of devices are formed on the wafer, at least one device overlapping a rectangular boundary of another device.

13. The invention of claim 9, wherein the non-straight line is cut using a laser or a milling machine.

14. The invention of claim 9, wherein a plurality of devices are formed on the wafer, at least one device overlapping a rectangular boundary of another device.

15. The invention of claim 9, wherein the device is deformed to change its transmission coefficients.

16. The invention of claim 9, wherein step (a) further comprises the step of annealing the wafer to produce a compressive force within the plane of the device.

17. An integrated optical device formed on a planar non-rectangular substrate, wherein the substrate has at least one non-straight edge, wherein a straight line from one port of the device to another port of the device passes outside of the planar non-rectangular substrate.

18. The invention of claim 17, wherein the device is separated from a wafer by cutting along at least one non-straight line.

19. The invention of claim 17, wherein the device is fabricated by:
  (a) forming the device on a wafer;
  (b) annealing the wafer to produce a compressive force within the plane of the device; and
  (c) separating the device from the wafer by cutting along at least one non-straight line.

20. The invention of claim 17, wherein the device is formed from a layer of device material on a wafer of substrate material, such that the layer of device material is thinner than the wafer of substrate material and the substrate material has a greater coefficient of thermal expansion than the device material.

21. The invention of claim 20, wherein the substrate material is silicon and the device material is silica.

22. The invention of claim 21, wherein:
  the non-straight edge is cut using a laser or a milling machine; and
  a plurality of devices are formed on the wafer, at least one device overlapping a rectangular boundary of another device.

23. The invention of claim 17, wherein the non-straight edge is cut using a laser or a milling machine.

24. The invention of claim 17, wherein a plurality of devices are formed on the substrate, at least one device overlapping a rectangular boundary of another device.

25. The invention of claim 17, wherein the device is deformed to change its transmission coefficients.

26. The invention of claim 17, wherein the device has a compressive force within the plane of the device.

27. A wafer comprising a plurality of integrated optical devices, wherein a straight line from one port of a first device to another port of the first device passes through a portion of a second device.

28. The invention of claim 27, wherein the first device has a compressive force within the plane of the first device.

29. The invention of claim 27, wherein the first device is formed from a layer of device material on a wafer of substrate material, such that the layer of device material is thinner than the wafer of substrate material and the substrate material has a greater coefficient of thermal expansion than the device material.

30. The invention of claim 29, wherein the substrate material is silicon and the device material is silica.

31. The invention of claim 27, wherein the first device is deformed to change its transmission coefficients.

32. An integrated optical device formed on a non-rectangular substrate, wherein the substrate has at least one non-straight edge, wherein a straight line from one port of the device to another port of the device passes outside of the non-rectangular substrate, wherein the device is fabricated by:
  (a) forming the device on a wafer;
  (b) annealing the wafer to produce a compressive force within the plane of the device; and
  (c) separating the device from the wafer by cutting along at least one non-straight line.

33. An integrated optical device formed on a non-rectangular substrate, wherein the substrate has at least one non-straight edge, wherein a straight line from one port of the device to another port of the device passes outside of the non-rectangular substrate, wherein a plurality of devices are formed on the substrate, at least one device overlapping a rectangular boundary of another device.

34. An integrated optical device formed on a non-rectangular substrate, wherein the substrate has at least one non-straight edge, wherein a straight line from one port of the device to another port of the device passes outside of the non-rectangular substrate, wherein the device has a compressive force within the plane of the device.

* * * * *